(12) United States Patent
Glenville et al.

(10) Patent No.: US 9,767,310 B2
(45) Date of Patent: Sep. 19, 2017

(54) SYSTEMS AND METHODS FOR SECURE DATA EXCHANGE AND DATA TAMPERING PREVENTION

(71) Applicant: Intercontinental Exchange Holdings, Inc., Atlanta, GA (US)

(72) Inventors: Matthew A. Glenville, Kent (GB); Finbarr Hutcheson, London (GB); Stelios E. Tselikas, London (GB); Antonios Gkoulousis, London (GB); Andrew J. Hill, Hertfordshire (GB)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

(21) Appl. No.: 15/287,137

(22) Filed: Oct. 6, 2016

(65) Prior Publication Data

US 2017/0024578 A1    Jan. 26, 2017

Related U.S. Application Data

(63) Continuation of application No. 15/047,153, filed on Feb. 18, 2016.

(60) Provisional application No. 62/119,422, filed on Feb. 23, 2015.

(51) Int. Cl.
*G06F 21/62* (2013.01)
*G06F 17/30* (2006.01)

(52) U.S. Cl.
CPC .... *G06F 21/6218* (2013.01); *G06F 17/30088* (2013.01)

(58) Field of Classification Search
CPC . H04L 1/00; H04L 63/00; H04L 63/14; H04L 63/1408; H04L 63/1441; H04L 63/1466
See application file for complete search history.

(56) References Cited

U.S. PATENT DOCUMENTS

| 7,620,697 | B1 * | 11/2009 | Davies | G06F 17/3089 709/217 |
| 7,657,474 | B1 * | 2/2010 | Dybala | G06Q 10/06 705/35 |
| 8,379,926 | B2 * | 2/2013 | Kanhere | G08G 1/0175 340/907 |

(Continued)

*Primary Examiner* — Dede Zecher
*Assistant Examiner* — Richard A McCoy
(74) *Attorney, Agent, or Firm* — DLA Piper LLP (US)

(57) ABSTRACT

Systems and methods for secure data exchange and data tampering prevention. A secure data system receives electronic data files from data entities and stores the files in a first storage. Each file includes data values collected by a respective data entity over a predefined time period. A benchmark system determines plural randomized snapshot times corresponding to the predefined time period. A data mapping is created between the first storage and plural second storage, based on the snapshot times and the number of files. Data values samples in each file are selectively transferred from the first storage to the plural second storage according to the data mapping. Each second storage stores samples synthesized from among the data entities associated with a single respective snapshot time. A benchmark data value is determined based on the synthetized samples stored in the plural second storage associated with the snapshot times.

23 Claims, 6 Drawing Sheets

(56) References Cited

U.S. PATENT DOCUMENTS

| | | | |
|---|---|---|---|
| 2002/0002636 A1* | 1/2002 | Vange | G06F 9/5027 719/328 |
| 2002/0071277 A1 | 6/2002 | Starner et al. | |
| 2004/0088242 A1* | 5/2004 | Ascher | G06Q 40/04 705/37 |
| 2006/0100949 A1* | 5/2006 | Whaley | G06Q 40/02 705/36 R |
| 2006/0253375 A1* | 11/2006 | Adcock | G06Q 40/06 705/37 |
| 2006/0253380 A1* | 11/2006 | Adcock | G06Q 40/04 705/37 |
| 2007/0083923 A1* | 4/2007 | Fluhrer | H04L 63/1466 726/12 |
| 2007/0219897 A1* | 9/2007 | Costa | G06Q 40/06 705/37 |
| 2008/0155009 A1* | 6/2008 | Jensen | G06Q 40/06 709/202 |
| 2009/0063366 A1* | 3/2009 | Friedman | G06Q 40/04 705/36 T |
| 2009/0119172 A1* | 5/2009 | Soloff | G06Q 30/02 705/344 |
| 2009/0171999 A1* | 7/2009 | McColl | G06F 17/30539 |
| 2009/0182868 A1* | 7/2009 | McFate | G06F 9/5027 709/224 |
| 2009/0271332 A1* | 10/2009 | Lo | G06Q 40/06 705/36 R |
| 2011/0131557 A1* | 6/2011 | Bouillet | G06F 9/541 717/138 |
| 2011/0202475 A1* | 8/2011 | Choueifaty | G06Q 40/06 705/36 R |
| 2013/0024347 A1* | 1/2013 | Nyhoff | G06Q 40/04 705/37 |
| 2013/0291060 A1* | 10/2013 | Moore | G06F 21/6245 726/1 |
| 2014/0086488 A1* | 3/2014 | Moteki | G06K 9/00483 382/182 |
| 2015/0082434 A1* | 3/2015 | Sethumadhavan | G06F 21/556 726/23 |
| 2015/0088719 A1* | 3/2015 | Gras | G06Q 40/00 705/35 |
| 2016/0110811 A1* | 4/2016 | Siu | G06Q 40/04 705/36 R |
| 2016/0142914 A1* | 5/2016 | He | H04L 67/34 726/12 |
| 2016/0269378 A1* | 9/2016 | Ye | H04L 63/08 |

* cited by examiner

SYSTEMS AND METHODS FOR SECURE DATA EXCHANGE AND DATA TAMPERING PREVENTION

TECHNICAL FIELD

The present disclosure relates generally to improving electronic data benchmarking and, in particular, to systems and methods for secure data exchange and data tampering prevention during electronic benchmarking.

BACKGROUND

Problems exist in the field of electronic data benchmarking, where benchmark data estimates may be received from various data sources. For purposes of this disclosure, electronic data benchmarking generally refers to characterizing a large collection of electronic data estimates received over a particular period of time. These benchmark estimates may not be an accurate representation of current data trends in an electronic data exchange environment. Each data source may use its own internal benchmark estimate methodology, which may be different from methodologies of other data sources. For example, an internal methodology may manipulate data values (for example, by emphasizing particular data values and deemphasizing other data values) in order to obtain a favorably-perceived benchmark estimate. In addition, a sender of a benchmark estimate may manipulate its benchmark estimate (compared to other benchmark estimates), to artificially influence a final benchmark value (aggregated across all benchmark estimates). As a result, a downstream computer system that aggregates benchmark estimates may be susceptible to data manipulation and data tampering by the various data sources. Accordingly, there is a need for systems and methods for securing data exchanges and preventing data tampering such that data integrity may be maintained, including for use in electronic data benchmarking functions.

SUMMARY

Aspects of the present disclosure relate to systems, methods and non-transitory computer-readable storage media for secure data exchange and data tampering prevention. The system includes a secure data system and a benchmark data generator system communicatively coupled to the secure data system. The secure data system is configured to receive a plural number of electronic data files from a respective plurality of data entities via secure communication over a network, and store the received electronic data files in a first storage of the secure data system. Each electronic data file includes data values collected by a respective one of the data entities over a predefined time period. The benchmark data generator system includes a randomized snapshot generator configured to determine, after the predefined time period, a plural number of randomized snapshot times corresponding to the predefined time period; plural second storage corresponding to the plural number of randomized snapshot times; and a synthetic data generator. The synthetic data generator is configured to: a) create a data mapping between the first storage and the plural second storage, based on the randomized snapshot times and the plural number of electronic data files and b) selectively transfer samples of the data values in each electronic data file from the first storage to the plural second storage according to the data mapping, such that each second storage stores corresponding samples synthesized from among all of the data entities associated with a single respective randomized snapshot time.

DETAILED DESCRIPTION

Figure 1:
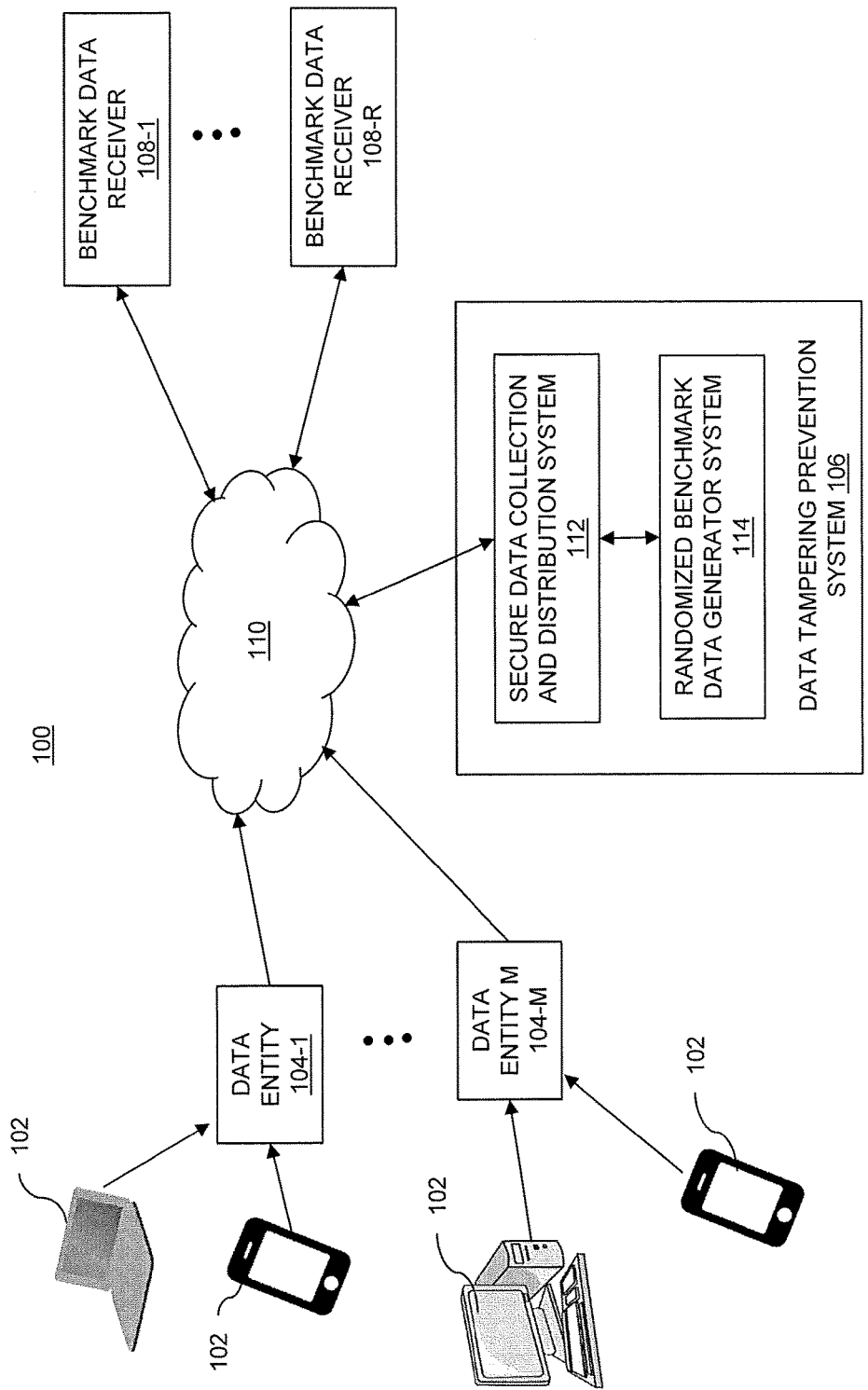
FIG. 1 is a functional block diagram of an example electronic data exchange environment including an example data tampering prevention system, according to an aspect of the present disclosure.

Aspects of the present disclosure generally relate to systems and methods for secure data exchange and data tampering prevention. In one aspect, the disclosed systems and methods may be used during electronic data benchmarking. It should be understood, however, that the systems and methods described herein are not limited thereto, but instead may be used in other suitable applications. An exemplary system may include a secure data system and a benchmark data generator system. The secure data system may be configured to securely receive a plural number (M) of electronic data files from a respective M data entities, and store the received electronic data files in a first storage of the secure data system. Each electronic data files may include any kind of information collected over any period of time. In one non-limiting implementation, for example, the electronic data files may include quote and associated volume data values corresponding to an asset (e.g., a currency and/or a tenor) collected by a respective data entity over a predefined time period. The benchmark data generator system may include a randomized snapshot generator configured to determine a plural number (N) of randomized snapshot times corresponding to the predefined time period. The generator system may also include a synthetic data generator (also referred to herein as a synthetic order book generator) and plural second storage (also referred to herein as synthetic order books) corresponding to the N randomized snapshot times. The synthetic data generator may be configured to selectively transfer samples of the data values in each electronic data file from the first storage to the plural second storage according to a data mapping between the first storage and the plural second storage. The data mapping may be based on the N snapshot times and the M number of electronic data files, such that each second storage stores corresponding samples synthesized from among all M data entities that are associated with a single respective randomized snapshot time. The benchmark data generator system may be configured to determine a benchmark data value based on the synthetized samples stored in the N second storage associated with the N randomized snapshot times.

The randomized snapshot generator may determine the randomized snapshot times after the predefined time period. In other words, the snapshot generator determines snapshot times after the data entities have collected the respective data. Because the snapshot times are randomized and determined after the data collection, data entities may be prevented from tampering with the collected data, thereby preventing manipulation of the benchmark value. This is because the data entities cannot predict which data samples the benchmark data generator system will select for the benchmark value determination. Even if a data entity could somehow manage to access the benchmark data generator system and obtain the generated randomized snapshot times, it would be too late for the data entity to use this information to tamper with the collected data. This is because the data entity's collected data is submitted before the snapshot times are determined. The secure data system may also prevent unauthorized users from submitting electronic files and reviewing the benchmark data value, by authenticating each user (i.e., data entities and benchmark data receivers). Accordingly, example data tampering prevention systems of the present disclosure may prevent data entities from altering the integrity of the benchmark value(s), and may prevent users from publishing a benchmark without authorization.

Because the synthetic data generator transfers data samples from each electronic data file, the synthetic data generator may extract a subset of electronic data, i.e., data associated only with randomized snapshot times. By extracting only a subset of data, the synthetic data generator may substantially reduce the volume of data used to determine the benchmark data value. For example, the secure data system may store four electronic data files received from four data entities, each file holding data collected over a two minute time period. The four data files may collectively hold about 45 million data points. By extracting data samples associated with 24 randomized time snapshots, the synthetic data generator may reduce the number of data points to be analyzed to about 20,000 points (i.e., a reduction by a factor of about 1,000). This significant reduction in data volume will improve the speed in transferring and loading data from the first storage into the second storage. This is because only the data needed to determine the benchmark value is transferred to the benchmark data generator system. The reduction in data volume may also increase a processing speed of the benchmark data generator system to determine the benchmark data value (i.e., processing about 20,000 data points as opposed to about 45 million data points).

Because the benchmark data generator system may use data collected from multiple data entities over a predefined time window, the benchmark value may better represent the overall electronic data exchange environment during the predefined time period. Thus, if data from one of the data entities is significantly different from data of the other entities, the benchmark value may not be substantially affected by these outlier data. Furthermore, the use of plural snapshot times and data from multiple data entities may make the benchmark more robust against attempted data manipulation and/or any momentary aberrations in the particular environment.

Turning now to FIG. 1, FIG. 1 is a functional block diagram illustrating example electronic data exchange environment 100 for secure data exchange and data tampering prevention, according to aspects of the present disclosure. Environment 100 may include one or more data entry devices 102, one or more data entities 104 (i.e., data entity 102-1, . . . , data entity 102-M, where M is an integer greater than or equal to 2), data tampering prevention system (DTPS) 106 and one or more benchmark data receivers 108 (i.e., receiver 108-1, . . . , receiver 108-R, where R is an integer greater than or equal to 1). Each of data entry devices 102, data entities 104, DTPS 106 and benchmark data receivers 108 may comprise one or more computing devices (such as computer system 600 shown in FIG. 6, for example), including a non-transitory memory storing computer-readable instructions executable by a processing device to perform the functions described herein. Although the description herein describes environment 100 having two or more data entities 104, in some examples, environment 100 may include one data entity 104 (i.e., where M is equal to 1).

Data entities 104, DTPS 106 and benchmark data receivers 108 may be communicatively coupled via network 110. Data entry devices 102 may be communicatively coupled to one or more of data entities 104 (e.g., data entity 104-1 and/or data entity 104-M) via direct electronic connection or wireless connection via one or more networks (not shown). Each of data entities 104 and benchmark data receivers 108 may be programmed to access DTPS 106 via network 110. Network 110 may include, for example, a private network (e.g., a local area network (LAN), a wide area network (WAN), intranet, etc.) and/or a public network (e.g., the Internet).

Data entry devices 102 may comprise a desktop computer, a laptop, a smartphone, tablet, or any other user device known in the art. A user may interact with one or more data entities 104 via a graphical user interface (not shown) displayed on any type of display device including a computer monitor, a smart-phone screen, tablet, a laptop screen or any other device providing information to a user.

Data entities 104 may be configured to receive electronic data from one or more data entry devices 102. In some examples, one or more of data entities 104 comprise a regulated electronic exchange system. In such examples, each data entity 104 may collect data over a predefined time period from among data entry devices 102. The type of data that is collected may depend on the particular implementation. The received data may be timestamped based on time of receipt by the respective data entity 104. At the conclusion of the predefined time period, each data entity 104 may send the collected data as an electronic data file to DTPS 106 using a secure file transfer via network 110. In some examples, each data entity 104 may send the respective electronic data file to DTPS 106 according to a managed file transfer (MFT) protocol. In some examples, one or more of data entities 104 may be configured to communicate with DTPS 106 via a direct wired connection.

DTPS 106 may include secure data collection and distribution system 112 (also referred to herein as secure data system 112) and randomized benchmark data generator system 114 (also referred to herein as generator system 114). In some examples, secure data system 112 and generator system 114 may be embodied on a single computing device. In other examples, secure data system 112 and generator system 114 may refer to two or more computing devices distributed over several physical locations, connected by one or more wired and/or wireless links. It should be understood that DTPS 106 refers to a computing system having sufficient processing and memory capabilities to perform the following specialized functions, and it does not necessarily refer to a specific physical location. An example computing system that may represent DTPS 106 is described below with respect to FIG. 6.

Secure data system 112 may be configured to receive an electronic data file from each data entity 104 (i.e., M electronic data files), authenticate each data entity 104 and validate each electronic data file. Secure data system 112 may then store each valid data file from authenticated data entities 104 (in first storage such as storage 216 of FIG. 2). In some examples, secure data system 112 may include a MFT server configured to securely transfer the electronic data files from data entities 104 through network 110. Each electronic data file received by secure data system 112 may represent raw or compressed data that were available on each data entity over the predefined time window. For example, for a predefined time window of 2 minutes, secure data system 112 may receive about 45 million data points from four data entities 104 (i.e., with M=4). In some examples, secure data system 112 may store a predetermined number of data levels from each received electronic data file (e.g., ranking the data according to value, and then segregating the data into levels or tiers such as the top 10 data value levels, the lowest 10 data value levels, etc.).

Generator system 114 may be configured to generate a plurality (N, where N is an integer greater than 1) of randomized snapshot times corresponding to the predefined time window and transfer data samples from among the electronic data files (associated with each data entity 104) stored by secure data system 112 to storage in generator system 114. For the same example discussed above, the transfer of, for example, data samples at 24 randomized snapshot times reduces the volume of data from about 45 million data points to about 20,000 data points. Generator system 114 may be configured to combine the transferred data samples, and generate a synthetic order book (i.e., a second storage) for each snapshot time. Thus, each synthetic order book may represent the entire data exchange environment 100 during the particular snapshot time. The transfer of data samples between first storage (e.g., see storage 216 of FIG. 2) of secure data system 112 and N plural order books (plural second storage such as storage 310 of FIG. 3) of generator system 114 may be performed according to a data mapping based on the N randomized snapshot times and the M number of electronic data files. Generator system 114 may also be configured to determine at least one benchmark data value, such as a benchmark SWAP rate, using the plural data samples across all data entities 104 and according to a volume weighted pricing. The benchmark data value(s) may be associated, for example, with one or more currencies and/or tenors Generator system 114 may send the benchmark data value(s) associated with the predefined time window to secure data system 112. Secure data system 112 may store the benchmark data value(s) in a secure storage (e.g., storage 218 of FIG. 2). Secure data system 112 may permit authorized benchmark data receivers 108 to poll the storage and transfer the benchmark data value(s) file to respective receivers 108, once the data value(s) are received from generator system 114. In some examples, secure data system 112 may be configured to publish the benchmark data value(s) (e.g., such as on a website) after a predetermined delay (e.g., 24 hours), to provide the benchmark data value(s) to users other than authorized benchmark data receivers 108. Secure data system 112 and generator system 114 are described further below, according to respective FIGS. 2 and 3.

Figure 2:
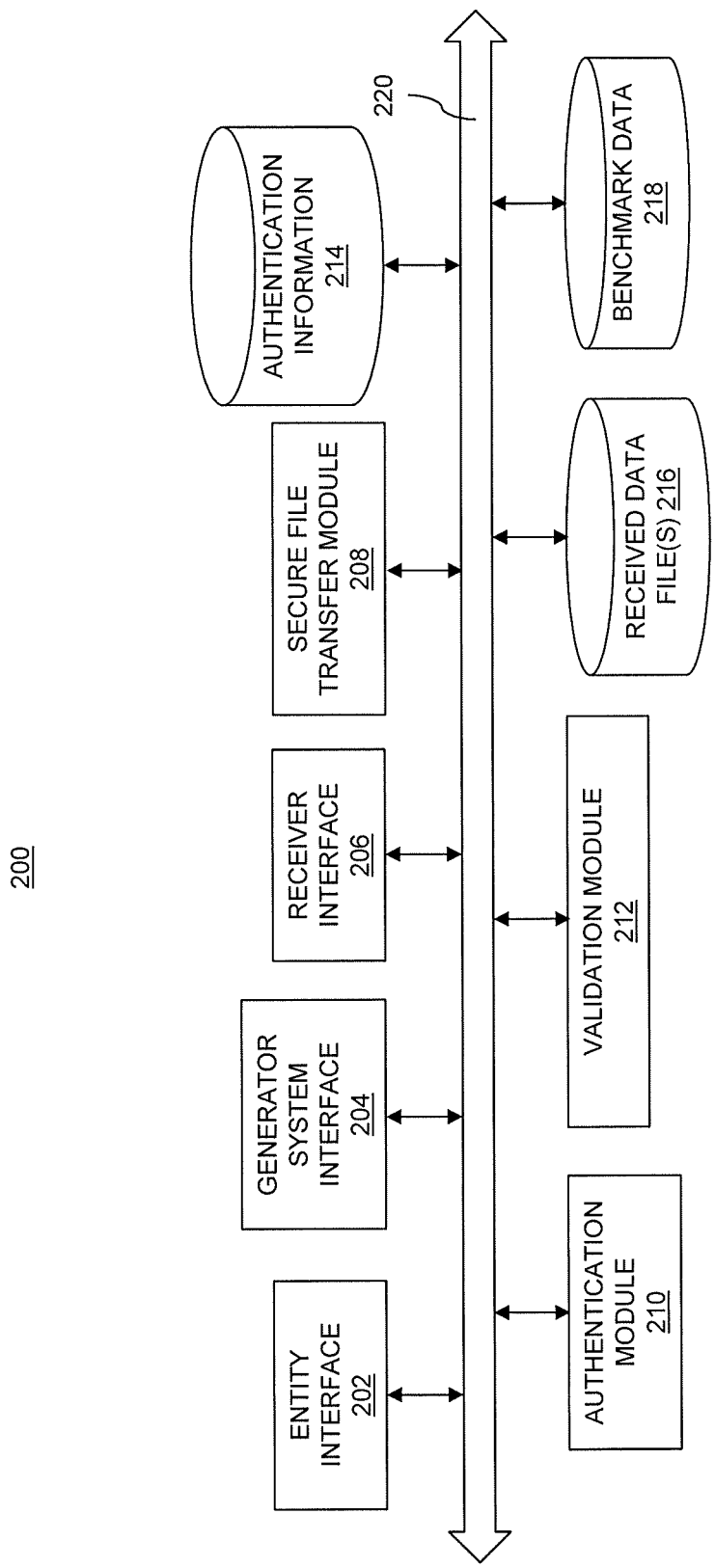
FIG. 2 is a functional block diagram of an example secure data collection and distribution system of a data tampering prevention system according to an aspect of the present disclosure.

FIG. 2 is a functional block diagram of example secure data collection and distribution system 200, according to an aspect of the present disclosure. Secure data system 200 may include entity interface 202, generator system interface 204, receiver interface 206, secure file transfer module 208, authentication module 210, validation module 212, authentication information storage 214, received data file storage 216 and benchmark data file storage 218, which may communicate with each other via data and control bus 220. Although not shown, in some examples, secure data system 200 may include a controller (e.g., a processor, a microcontroller, a circuit, software and/or other hardware component(s)) specially configured to control operation of interfaces 202-206, modules 208-212 and storage 214-218.

Entity interface 202 may be configured to securely communicate with data entities (e.g., see data entities 104 of FIG. 1) via a network (e.g., see network 110 of FIG. 1), to receive login information from the data entities and receive electronic data files from authorized data entities. For example, entity interface 202 may be configured to securely receive multiple electronic files, each having a large volume of electronic data (e.g., about 11 million data points).

Generator system interface 204 may be configured to securely communicate with a generator system (e.g., see FIG. 1, item 114), to provide the generator system access to the received electronic data files stored in storage 216. Generator system interface 204 may also be configured to receive benchmark data value(s) from a generator system, such that the received benchmark data is stored in benchmark storage 218. Generator system interface 204 may be configured to communicate with a generator system via a wired and/or wireless connection.

Receiver interface 206 may be configured to securely communicate with benchmark data receivers (e.g., see data receivers 108 of FIG. 1) via a network (e.g., see network 110 of FIG. 1), to receive login information from the data receivers and to provide authorized receivers access to benchmark data value(s) stored in storage 218.

Secure file transfer module 208 may be configured to provide secure file transfer of electronic data files from data entities (e.g., see data entities 104 of FIG. 1) to secure data system 200, and secure file transfer of benchmark data value(s) files to data receivers. Secure file transfer module 208 may be configured to securely transfer files over a network using one or more encrypted file transfer protocols, such as, without being limited to, File Transfer Protocol Secure (FTP/S), Odette FTP (OFTP), Secure Shell FTP (SFTP), secure copy protocol (SCP), Applicability Statement 2 (AS2), and Hypertext Transfer Protocol Secure (HTTP/S). A secure file transfer between a data entity (or a data receiver) may be established based on a network address of the data entity (or the data receiver).

Authentication module 210 may be configured to authenticate data entities (e.g., see data entities 104 of FIG. 1) and data receivers (e.g., see data receivers 108 of FIG. 1) against authentication information stored in authentication storage 214, in order to permit or deny secure electronic file transfer. In some examples, authentication module 210 may also be configured to authenticate a data generator system (e.g., see data generator system 114 of FIG. 1) against authentication information in authentication storage 214. Although authentication storage 214 is shown as being part of secure data system 200, in some examples, authentication storage 214 may be in one or more locations remote from secure data system 200, accessible by authentication module 210 via a network.

Authentication module 210 may, for example, compare received data entity information (e.g., user name, password, file transfer address and/or Internet protocol (IP) address of each data entity (e.g., see data entity 104 of FIG. 1)) to corresponding authentication information in authentication information storage 214. If the received information matches the stored authentication information, the respective data entity may be permitted to transfer the electronic data file to secure data system 200. For example, when authentication module 210 authenticates a data entity (via the matching), authentication module 210 may indicate the authentication to secure file transfer module 208, and cause secure file transfer module 208 to initiate secure file transfer of the electronic data file to storage 216. If the received information is not authenticated (i.e., does not match the stored authentication information), file transfer may be denied.

A similar comparison and matching process may occur for data receivers. Thus, only when received receiver information (e.g., user name, password, file transfer address and/or Internet protocol (IP) address of a respective receiver 108) is authenticated (against authentication information in storage 214) will the respective data receiver be permitted access to benchmark data value(s) stored in benchmark storage 218. For example, when new benchmark data value(s) are stored in storage 218, secure data system 200 may electronically indicate the presence of the new benchmark data value. Data receivers may periodically poll the secure data system 200, via receiver interface 206, to detect the presence of the new benchmark data value(s). When new benchmark data value(s) are detected by data receivers, each data receiver may provide receiver authorization information to access the benchmark data value(s). When authentication module 210 authenticates a data receiver (via the matching), authentication module 210 may indicate the authentication to secure file transfer module 208, and cause secure file transfer module 208 to initiate secure file transfer of the benchmark data value(s) in storage 218 to a respective data receiver. If the received information is not authenticated (i.e., does not match the stored authentication information), file transfer may be denied.

Each electronic data file received from a data entity may be configured in a predefined file format, such as a comma-separated values (CSV) file format, having timestamped quotes and volumes columns related to currencies and/or tenors for all data collected in a predefined time period. The data in the data file may be arranged in a particular order (such as arranging data with prices in descending order). Data points in the file may be expected to be a numerical, non-zero value. A received electronic data file may include raw data collected by a respective data entity, or may be configured in a compressed file format.

Validation module 212 may be configured to analyze the data in each received electronic data file (e.g., from data entities such as those shown in FIG. 1), to determine whether the data is valid. For example, validation module 212 may determine whether the data file includes numerical and non-zero data, whether the data includes any anomalies (such as a greater than zero quote price for an asset at a particular timestamp with zero volume), whether the columns and/or rows of the data file are configured in a predetermined arrangement, whether the file has quote prices arranged in a descending order, etc. Validation module 212 may reject an electronic data file that does not pass the validation check(s). In some examples, validation module 212 can exclude data files from one or more particular data entities on particular days and/or particular times of day. In some examples, validation module 212 may be configured to rearrange data values in one or more electronic data files, for example, for consistency across files and/or for easier searching and/or processing by a generator system according to this disclosure (e.g., see generator system 114 of FIG. 1).

In some examples, validation module 212 may be configured to cause secure data system 200 to generate a no publication indicator, after the validation check, if there are fewer than a predetermined number of data points per electronic file that are valid and/or if there are fewer than a predetermined number of electronic data files that are valid.

Authentication information storage 214 may be specially configured to store authentication information for data entities, data receivers and data generator systems. Data file storage 216 may be specially configured to store each received electronic data file (after validation by module 212). Benchmark storage 218 may be specially configured to store benchmark data value(s) received from a data generator system. Each of storage 214, 216, 218 may be configured to securely store files using one or more data encryption methods (e.g., public key encryption, symmetric key encryption, etc.), to prevent tampering with the respective data. In some examples, a data generator system may be permitted access to received data files storage 216 based on decryption of the stored data files (e.g., using a private decryption key). In some examples, a data generator system may encrypt benchmark data value(s) sent to secure data system 200.

In some examples, secure data system 200 may electronically indicate the presence of new electronic data files stored in data file storage 216 for the predefined time period (e.g., after being received from data entities and validated by validation module 212). A data generator system may poll secure data system 200 (e.g., after the predefined time period), via generator system interface 204, to detect the presence of the new electronic data files.

Figure 3:
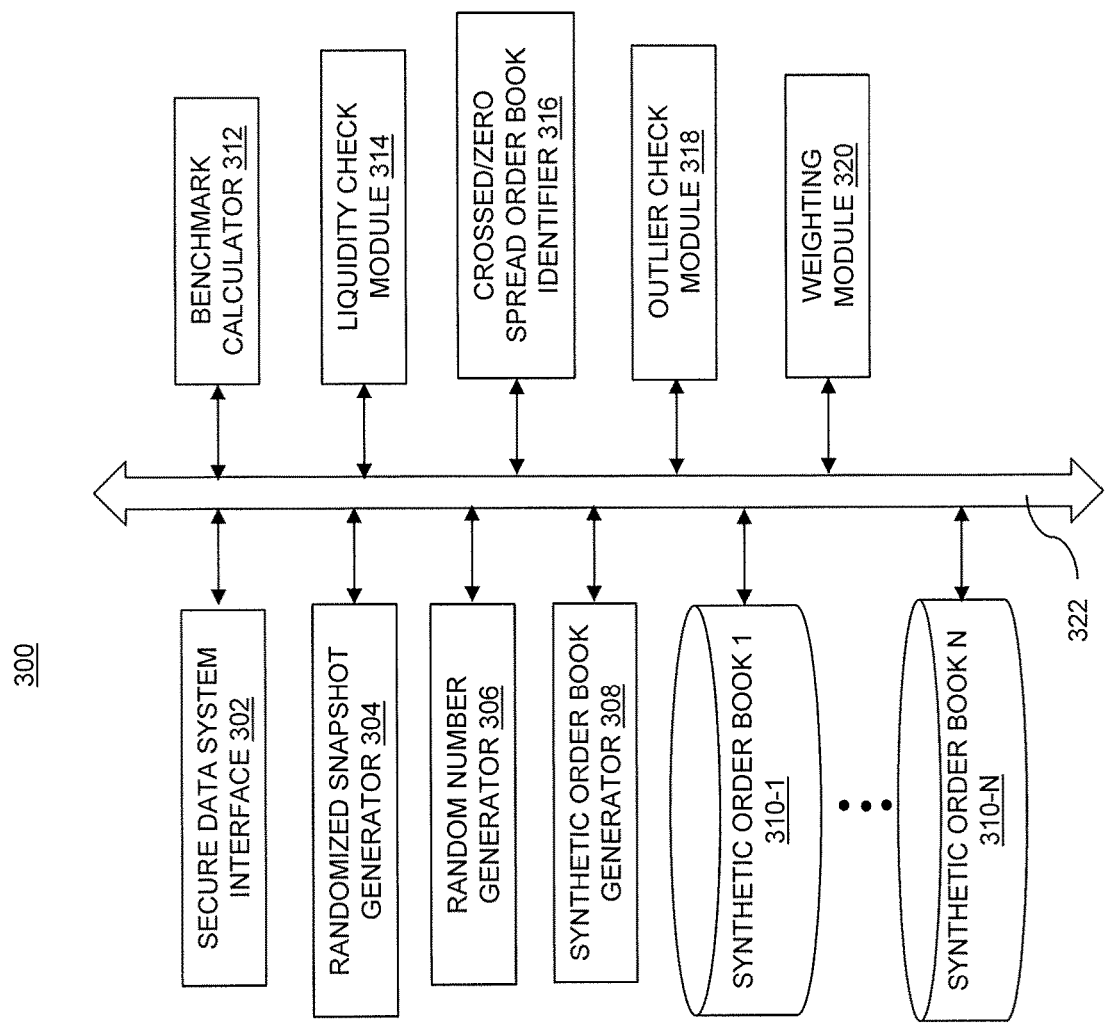
FIG. 3 is a functional block diagram of an example randomized benchmark data generator system of a data tampering prevention system according to an aspect of the present disclosure.

FIG. 3 is a functional block diagram of an exemplary randomized benchmark data generator system 300, according to an aspect of the present disclosure. Generator system 300 may include secure data system interface 302, randomized snapshot generator 304, random number generator 306, synthetic order book generator 308, synthetic order book storage 310 (i.e., storing order books 310-1, . . . , 310-N, where N represents the number of snapshot times), benchmark calculator 312, liquidity check module 314, crossed/zero spread order book identifier 316, outlier check module 318 and weighting module 320, which may communicate with each other via data and control bus 322. Although not shown, in some examples, generator system 300 may include a controller (e.g., a processor, a microcontroller, a circuit, software and/or other hardware component(s)) specially configured to control operation of interface 302, randomized snapshot generator 304, random number generator 306, synthetic order book generator 308, storage 310, benchmark calculator 312 and modules 314-320.

Secure data system interface 302 may be configured to securely communicate with a secure data system (e.g., see secure data system 200 of FIG. 2). In some examples, communication between generator system 300 and the secure data system may include encrypted communication. Secure data system interface 302 may be configured to provide generator system 300 access to received electronic data files stored in storage (e.g., such as storage 216 of FIG. 2), for transferring data samples according to a data mapping (described further below). Secure data system interface 302 may also be configured to transmit benchmark data value(s) to the secure data system, such that the benchmark data value(s) are stored in a benchmark storage (e.g., such as benchmark storage 218 of FIG. 2). Secure data system interface 302 may be configured to communicate with the secure data system via a wired and/or wireless connection.

Randomized snapshot generator 304 may be configured to determine an N number of randomized snapshot times for the predefined time period. In the examples described herein, the number of snapshot times N is greater than or equal to 2. The use of multiple, randomized snapshot times corresponding to the predefined time period may make the benchmark value(s) (calculated by benchmark calculator 312) more robust against attempted manipulation and momentary aberrations in the data exchange market, as compared to a single snapshot at a predetermined time. In some examples, however, the number of snapshots times may be one (i.e., N=1). For a single snapshot time, it may still be desirable to select a randomized time within the predefined time period, to reduce the possibility of attempted data manipulation.

In operation, randomized snapshot generator 304 may be activated responsive to an indication by a secure data system (e.g., system 200 of FIG. 2) that new electronic data files associated with the predefined time period are stored in a storage (e.g., see storage 216 of FIG. 2) (e.g., based on polling by generator system 300 and/or based on an electronic indication received from the secure data system by generator system 300). Upon activation, randomized snapshot generator 304 may generate N randomized snapshot times for the predefined time period, based on random numbers generated by random number generator 306. Random number generator 306 may include a circuit, hardware and/or software and may be configured to generate one or more random numbers. Examples of random number generator 306 may include hardware random number generators and pseudorandom number generators. Generation of N randomized snapshot times is described further below with respect to FIG. 5.

Synthetic order book generator 308 may be configured to receive the N randomized snapshot times from randomized snapshot generator 304 and create N separate synthetic order books 310 (i.e., 310-1, . . . , 310-N) (i.e., one synthetic order book for each snapshot time). Synthetic order book generator 308 may create a data mapping between data file storage (e.g., see storage 216 of secure data system 200 of FIG. 2) and synthetic order books 310, based on the N randomized snapshot times and the M electronic data files. Synthetic order book generator 308 may then transfer data samples from each of the M electronic data files (in storage) to the N synthetic order books 310 (i.e., separate storage locations in storage 310) according to the data mapping. Thus, based on the data mapping, for each snapshot time (e.g., snapshot time 1), synthetic order book generator 308 may combine the respective data samples (corresponding to snapshot time 1 from among all M electronic data files) and populate each synthetic order book (e.g., synthetic order book 310-1) with the combined (i.e., synthesized) data samples. In some examples, each synthetic order book 310 (e.g., synthetic order book 310-1) may represent the best tradable quote prices (and accompanying volumes) available across the entire electronic data exchange market at that snapshot time (e.g., at snapshot time 1).

Benchmark calculator 312 may be activated responsive to the creation and population of the N synthetic order books 310 (e.g., by synthetic order book generator 308 or a controller). Benchmark calculator 312 may determine at least one benchmark data value representative of the entire data exchange environment (e.g., see data exchange environment 100 of FIG. 1), based on the N synthetic order books 310 representative of M data entities (e.g., see data entities 104 of FIG. 1). Benchmark calculator 312 may control liquidity check module 314, crossed/zero spread order book identifier 316, outlier check module 318 and weighting module 320 during the benchmark process, in order to determine the benchmark data value(s).

Benchmark calculator 312 may be configured to determine a volume weighted data value for each snapshot time (based on the synthesized data samples in a respective synthetic order book 310), to form N volume weighted snapshots. Benchmark calculator 312 may apply liquidity check module 314, crossed/zero spread order book identifier 316 and outlier check module 318 to the N volume weighted snapshots, to discard volume weighted snapshots that do not satisfy predetermined conditions determined by these respective modules (described further below). Benchmark calculator 312 may apply a quality weighting to each remaining volume weighted snapshot (described further below). Benchmark calculator 312 may then determine a weighted average (based on the quality weighting) for the remaining snapshots, to form the benchmark data value(s).

In some examples, the electronic data files may relate to electronic market data relating to one or more assets (or any type of assets). The electronic market data may include electronic quote data (i.e., bid(s) and/or offer(s) data) and associated volume data relating to the one or more assets. In some examples, benchmark calculator 312 may be used to determine benchmark value(s) in an electronic asset exchange environment (e.g., an electronic trading platform) based on calculating a volume weighted average mid-price (VWAMP), from theoretically filling an electronic trade in a standard market size (SMS) on both the electronic bid side and electronic offer side at a particular instant in time (i.e., a snapshot time). A SMS represents a volume for the standardised electronic trade to be filled. Standard Market Sizes may be different for each currency and tenor. Benchmark calculator 312 may determine volume weighted prices at which an electronic trade in SMS may be filled from the associated synthetic order book 310 (e.g., synthetic order book 310-1 for snapshot time 1). The volume weighted prices are determined based on both the electronic bid data and electronic offer data, forming volume weighted bid (VWB) prices and volume weighted offer (VWO) prices, respectively. The VWB and VWO prices may be used to calculate the VWAMP. In some examples, the benchmark data value may represent a mid-price that would be obtained if a trade of SMS is theoretically filled using the best prices available on the M data entities at the relevant times (snapshot times) and in the relevant currencies and tenors. (The theoretical (i.e., simulation) filling does not represent an actual trade).

Liquidity check module 314 may be configured to identify illiquid volume weighted snapshots. Illiquid snapshots may represent any snapshots that cannot fill the SMS (on both the bid and offer side). Liquidity check module 314 may cause the identified illiquid snapshots to be discarded, so that only VWAMPs from reasonably sized trades may be included in the benchmark calculation.

Crossed/zero spread order book identifier 316 (also referred to herein as identifier 316) may be configured to identify any crossed synthetic order books 310 and/or any zero spread synthetic order books 310. A crossed order book may occur if bid prices in the order book are higher than the offer prices. A zero spread order book may occur if the order book contains a VWB and VWO which are equal to each other. Identifier 316 may cause the identified crossed and/or zero spread order book(s) to be excluded from the benchmark data value calculation by benchmark calculator 312.

Outlier check module 318 may be configured to identify outlier volume weighted snapshots, to protect against momentary and unrepresentative spikes in price. Outlier check module 318 may compare the VWAMP for each snapshot to one or more predetermined thresholds, to identify outliers that are outside of the threshold(s). Outlier check module 318 may then cause the identified outlier snapshots to be discarded. For example, snapshots that pass the liquidity check may be ranked in order of their VWAMPs, and any snapshots higher than the $75^{th}$ percentile and lower than the $25^{th}$ percentile may be discarded by outlier check module 318, thereby leaving only the most representative volume weighted snapshots of the electronic data exchange environment.

Weighting module 320 may be configured to determine a quality weighting to the remaining volume weighted snapshots. Weighting module 320 may apply a higher weighting to snapshots with tighter spreads between the VWB and VWO. Weighting module 320 may apply a lower weighting to snapshots with higher VWB and VWO spreads. A higher weighting may be applied to tighter spreads, because these snapshots may have more volume executable closer to the mid-point, and therefore may be indicative of a better quality market. Benchmark calculator 312 may apply the quality weighting to the remaining snapshots, and determine a final benchmark data value, based on a quality weighted average of the remaining volume weighted snapshots.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Figure 4:
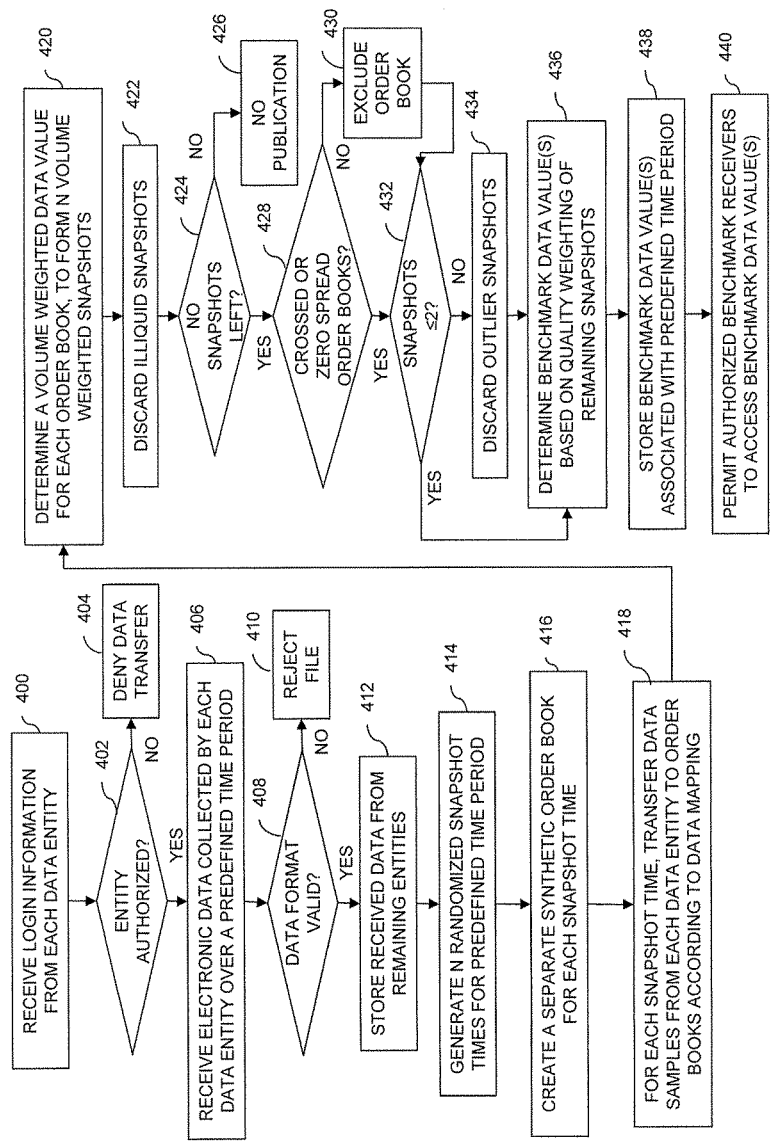
FIG. 4 is a flowchart diagram of an example method of secure data exchange and prevention of data tampering in the generation of a benchmark value associated with the electronic data exchange environment shown in FIG. 1, according to an aspect of the present disclosure.
Figure 5:
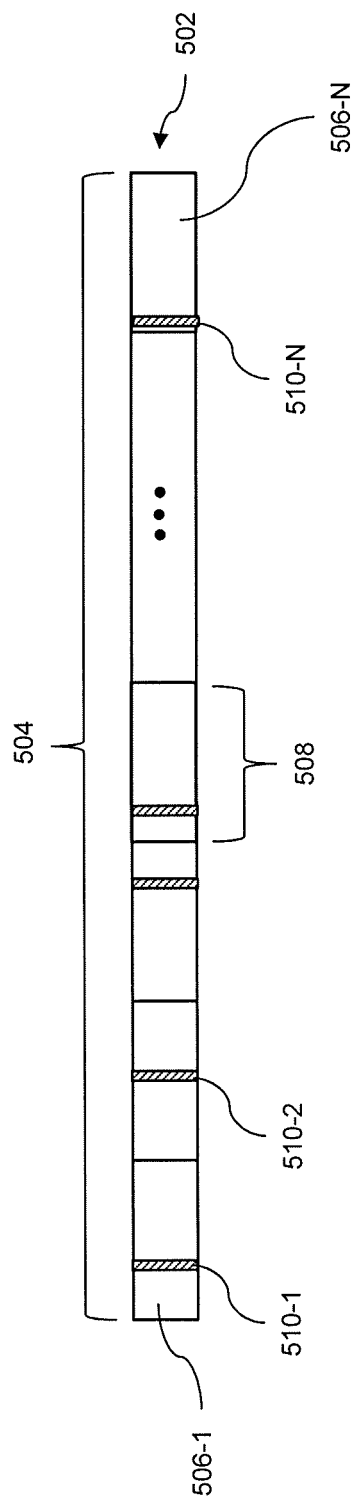
FIG. 5 is a diagram illustrating generation of randomized snapshots in a predefined time window, according to an aspect of the present disclosure.

Those skilled in the art will appreciate that DTPS 106 (of FIG. 1) may be configured with more or less modules to conduct the methods described herein with reference to FIGS. 4 and 5. As illustrated in FIG. 4, the method shown may be performed by processing logic (e.g., such as processing logic 604 in FIG. 6) that may comprise hardware (e.g., circuitry, dedicated logic, programmable logic, microcode, etc.), software (such as instructions run on a processing device), or a combination thereof. In one embodiment, the method shown in FIG. 4 may be performed by one or more specialized processing components associated with components 202-220 of secure data system 200 of FIG. 2 and components 302-320 of generator system 300 of FIG. 3.

FIG. 4 illustrates a flowchart diagram of an example method of secure data exchange and prevention of data tampering in the generation of a benchmark value associated with the electronic data exchange environment 100 shown in FIG. 1, according to an aspect of the present disclosure. FIG. 4 is described with reference to FIGS. 1-3. In this non-limiting example, it shall be assumed that the electronic data exchange environment 100 of FIG. 1 refers to an electronic asset exchange environment, and that all components and functions referenced with respect to FIG. 4 have been configured for functioning in that environment for purposes of this illustrative application. It should be understood, however, that the present disclosure is not limited to the exemplary implementation illustrated with respect to FIG. 4. To the contrary, as noted above, the secure data exchange and tamper prevention technology discussed herein may be used in any data exchange environment.

At step 400, secure data system 112 or 200 may receive login information from each of M data entities 104. For example, authentication module 210 may receive login information via entity interface 202 over network 110. At step 402, authentication module 210 may determine whether each data entity 104 is authorized to send an electronic data file to secure data system 112 or 200, based on predetermined authentication information stored in storage 214.

When authentication module 210 determines, at step 402, that a respective data entity 104 is not authorized, authentication module 210 may deny any data transfer (step 404) from the particular data entity 104.

When authentication module 210 determines, at step 402, that a respective data entity 104 is authorized, secure data system 112 or 200 may, at step 406, permit transfer of the electronic data file from the particular data entity 104. For example, authentication module 210 may cause secure file transfer module 208 to initiate a secure file transfer via entity interface 202 over network 110. Each electronic data file may include timestamped tradeable quote data and corresponding volume data for one or more assets (e.g., various currencies and/or tenors) collected by the corresponding data entity 104 over a predefined time period. For example, secure data system 112 or 200 may receive electronic data collected over a two minute time period (e.g. 10:58 am to 11:00 am), prior to benchmark data value(s) calculation. This electronic data may include tradeable quote data and corresponding volume data that were available on the corresponding data entity 104 during the predefined time period (e.g., 10:58 am to 11:00 am).

At step 408, validation module 212 may determine whether the data format of each received electronic file is valid, based on predetermined conditions. When validation module 212 determines, at step 408, that the data format of a particular electronic data file is not valid, validation module 212 may reject the electronic data file (step 410).

When validation module 212 determines, at step 408, that the data format of a particular electronic data file is valid, validation module 212 may cause the received electronic data file to be stored in storage 216 (step 412). It is understood that steps 400-412 may be repeated for each electronic data file from the M data entities 104.

At step 414, randomized snapshot generator 304 may generate N randomized snapshot times for the predefined time period. For example, generator system 114 or 300 may detect that secure data system 112 or 200 has newly stored M electronic data files for the predefined time period from M data entities 104 in storage 216. Responsive to this detection, generator system 114 or 300 may activate randomized snapshot generator 304.

The randomized snapshot times are described with respect to FIG. 5, which shall be described with reference to FIGS. 1-3. FIG. 5 is a diagram illustrating generation of randomized snapshot times 510 in predefined time period 504, for timestamped electronic data 502 of a single electronic data file (e.g., stored in storage 216 of FIG. 2). To generate the randomized snapshot times 510, randomized snapshot generator 304 may divide predefined time period 504 (e.g., a two minute window) into N data blocks 506 (block 506-1, . . . , 506-N), each having a segment time period 508.

For example, a 2 minute time period 504 may be divided into N=24 blocks 506, with each block 506 being 5 seconds long (i.e., a 5 second segment time period 508).

Randomized snapshot generator 304 may generate a randomized snapshot time 510 in each block 506, based on N random numbers generated by random number generator 306. Thus, randomized snapshot generator 304 may generate randomized snapshot times 510-1, . . . , 510-N. For example, a randomized snapshot (to the nearest millisecond) may be generated in each 5 second block. The randomized snapshot times 510 may ensure that there is adequate spacing between snapshot times. For example, while any two snapshot times 510 may randomly be close together (e.g., at either side of a block 506 boundary), three snapshot times may not be close to each other, because there will always be a whole block 506 separating the outer two blocks. Accordingly, the snapshot time 510 may be spaced appropriately through the window.

In addition, because the snapshot times 510 are randomized, individuals (such as data entities 104 of FIG. 1) cannot predict which data samples will be used to generate the benchmark data value(s). Also, the snapshot times 510 are selected after data entities 104 have transferred the electronic data files to secure data system 112 or 200. Both the selection of snapshot times after data collection and the use of randomized snapshot times 510 may prevent tampering with data values, because individuals cannot predict snapshot times, providing less of an ability for the individuals to artificially influence the benchmark data value calculation.

Referring back to FIG. 4, at step 416, synthetic order book generator 308 may create a separate synthetic order book 310 for each snapshot time 510. Thus, synthetic order book generator 308 may create N synthetic order books 310-1, . . . , 310-N.

At step 418, synthetic order book generator 308 may communicate with storage 216 of secure data system 112 or 200 (via interface 302) and create a data mapping between storage 216 and synthetic order books 310. The data mapping may be based on the N randomized snapshot times and the M electronic data files (stored in storage 216). Synthetic order book generator 308 may selectively transfer data samples (i.e., a subset of data) from among storage 216 to synthetic order books 310, according to the data mapping. Based on the data mapping, each synthetic order book 310 (e.g., order book 310-1) may store corresponding data samples synthesized (i.e., combined) from among all M data entities associated with a single respective snapshot time 510 (e.g., snapshot time 510-1). Accordingly, synthetic order book generator 308 may create a synthetic order book 310 at each snapshot time 510, from all of the price data and volume data that were tradeable across any data entity 104 at that particular moment in time. In some examples, synthetic order book generator 308 may also rank bid and offer data in each synthetic order book 310 by price.

At step 420, benchmark calculator 312 may determine a volume weighted data value for each synthetic order book 310, to form a total of N volume weighted snapshots (i.e., one snapshot associated with a respective order book 310). For example, the bid and offer data in each synthetic order book 310 may be used to calculate the VWB, VWO and VWAMP if a trade of SMS were filled.

As discussed above, the SMS represents the volume for a standardized trade to be filled, and may depend upon the asset and tenor. Example Standard Market Sizes for each tenor in each predefined time period are show in Table 1 (numbers in millions).

TABLE 1

Example Standard Market sizes

| Tenor | EUR Rates 1100 | EUR Rates 1200 | GBP Rates 1100 | USD Rates 1100 | USD Spreads 1100 | USD Rates 1500 |
|---|---|---|---|---|---|---|
| 1 Year | 150 | 150 | 100 | 250 | — | 250 |
| 2 Years | 125 | 125 | 75 | 200 | 200 | — |
| 3 Years | 100 | 100 | 50 | 150 | 150 | — |
| 4 Years | 100 | 100 | 30 | 100 | 100 | — |
| 5 Years | 75 | 75 | 25 | 100 | 100 | — |
| 6 Years | 60 | 60 | 25 | 75 | — | — |
| 7 Years | 50 | 50 | 20 | 75 | 75 | — |
| 8 Years | 50 | 50 | 15 | 50 | — | — |
| 9 Years | 40 | 40 | 15 | 50 | — | — |
| 10 Years | 40 | 40 | 15 | 50 | 50 | — |
| 12 Years | 40 | 40 | 10 | — | — | — |
| 15 Years | 30 | 30 | 10 | 40 | — | — |
| 20 Years | 25 | 25 | 10 | 40 | — | — |
| 25 Years | 25 | 25 | 10 | — | — | — |
| 30 Years | 20 | 20 | 10 | 25 | — | — |

Steps 414-436 for determining a benchmark data value are described below with respect to an example. The example assumes a standard market size of 50 million, taking data from three trading venues at one snapshot time (for one currency and tenor, and only showing the top 5 price levels from each venue). The full granularity of each price may be used during the calculation and the final output may be rounded to three decimal places for the publication of the final benchmark data value. To simplify the example, granularity to 4 decimal places is shown.

Tables 2-4 illustrate example collected bid and offer data for respective data entity 104-1 (trading venue 1), data entity 104-2 (trading venue 2) and data entity 104-3 (trading venue 3). Table 5 illustrates example bid and offer data from trading venues 1-3 (shown in Tables 2-4) combined into a synthetic order book (for a single snapshot time). Tables 2-5 represent step 418 for a single snapshot time.

TABLE 2

Bid and Offer Data in Trading Venue 1 for Single Snapshot Time
Trading Venue 1

| Bid | | Offer | |
|---|---|---|---|
| Vol (m) | Price | Price | Vol (m) |
| 16 | 1.4530 | 1.5400 | 30 |
| 32 | 1.4360 | 1.5630 | 49 |
| 13 | 1.3730 | 1.6210 | 28 |
| 23 | 1.3050 | 1.6520 | 50 |
| 37 | 1.2980 | 1.7100 | 44 |

TABLE 3

Bid and Offer Data in Trading Venue 2 for Single Snapshot Time
Trading Venue 2

| Bid | | Offer | |
|---|---|---|---|
| Vol (m) | Price | Price | Vol (m) |
| 32 | 1.4590 | 1.5480 | 17 |
| 40 | 1.4050 | 1.5660 | 19 |
| 17 | 1.3740 | 1.6250 | 31 |
| 39 | 1.3340 | 1.6820 | 30 |
| 33 | 1.2830 | 1.7210 | 28 |

TABLE 4

Bid and Offer Data in Trading Venue 3 for Single Snapshot Time
Trading Venue 3

| Bid | | Offer | |
|---|---|---|---|
| Vol (m) | Price | Price | Vol (m) |
| 19 | 1.4500 | 1.5260 | 23 |
| 35 | 1.4490 | 1.5750 | 26 |
| 36 | 1.3850 | 1.6320 | 40 |
| 39 | 1.3180 | 1.6920 | 42 |
| 49 | 1.2660 | 1.7430 | 44 |

TABLE 5

Bid and Offer Data in Synthetic Order
Book Associated with Single Snapshot Time
Synthetic Order Book

| Bid | | Offer | |
|---|---|---|---|
| Vol (m) | Price | Price | Vol (m) |
| $32^2$ | $1.4590^2$ | $1.5260^3$ | $23^3$ |
| $16^1$ | $1.4530^1$ | $1.5400^1$ | $30^1$ |
| $19^3$ | $1.4500^3$ | $1.5480^2$ | $17^2$ |
| $35^3$ | $1.4490^3$ | $1.5630^1$ | $49^1$ |
| $32^1$ | $1.4360^1$ | $1.5660^2$ | $19^2$ |

In Table 5, $^1$represents trading venue 1, $^2$represents trading venue 2, $^3$represents trading venue 3, and $^4$represents trading venue 4.

Benchmark calculator 312 may identify the price levels that cumulatively allow for filling the Standard Market Size (in this case 50 m) from the Synthetic Order Book (Table 5). The identified price levels for this example are shown in Table. 6.

TABLE 6

Identification of volumes and price levels
to use to simulate filling an order of SMS
Synthetic Order Book

| Bid | | | Offer | | |
|---|---|---|---|---|---|
| Vol used for SMS (m) | Vol (m) | Price | Price | Vol (m) | Vol used for SMS (m) |
| 32* | 32* | 1.4590* | 1.5260* | 23* | 23* |
| 16* | 16* | 1.4530* | 1.5400* | 30* | 27* |
| 2* | 19* | 1.4500* | 1.5480 | 17 | |
| | 35 | 1.4490 | 1.5630 | 49 | |
| | 32 | 1.4360 | 1.5660 | 19 | |

In Table 6, *represents volumes and price levels used to simulate filling an order of SMS.

Benchmark calculator 312 may then simulate filling an order of SMS (e.g. 50 m), by calculating the volume weighted prices on the bid and offer side (VWB and VWO) using the volumes and price levels that were identified. In this example:

$$VWB = \frac{32}{50} \times 1.4950 + \frac{16}{50} \times 1.4530 + \frac{2}{50} \times 1.4500 = 1.4567$$

$$VWO = \frac{23}{50} \times 1.5260 + \frac{27}{50} \times 1.5400 = 1.5336$$

The VWAMP is the mid-point of the Volume Weighted Bid and Volume Weighted Offer:

$$VWAMP = \frac{1.4567 + 1.5336}{2} = 1.4952$$

For this snapshot, VWB is 1.4567; VWO is 1.5336 and VWAMP is 1.4952.

The process of creating a synthetic order book and calculating the VWAMP may then be repeated for each of the 24 snapshot times, to form N=24 volume weighted snapshots. Table 7 illustrates the 24 volume weighted snapshots for this example. Tables 6 and 7 represent the process of determining volume weighted snapshots (step 420).

TABLE 7

24 Volume Weighted Snapshots

| Snapshot Time | VWB | VWO | VWAMP |
|---|---|---|---|
| 10:58 02 s 125 ms | 1.4567 | 1.5336 | 1.4952 |
| 10:58 07 s 145 ms | 1.4935 | 1.5062 | 1.4999 |
| 10:58 12 s 568 ms | 1.4859 | 1.5092 | 1.4976 |
| 10:58 19 s 821 ms | 1.4962 | 1.5051 | 1.5007 |
| 10:58 20 s 125 ms | 1.4967 | 1.5034 | 1.5001 |
| 10:58 28 s 855 ms | 1.4812 | 1.5151 | 1.4982 |
| $^{IL}$10:58 31 s 005 ms | 1.4967 | 1.5028 | 1.4998 |
| 10:59 38 s 599 ms | 1.4989 | 1.5005 | 1.4997 |
| 10:58 44 s 525 ms | 1.4922 | 1.5092 | 1.5007 |
| 10:58 47 s 519 ms | 1.4965 | 1.5074 | 1.5020 |
| 10:58 52 s 325 ms | 1.4981 | 1.5134 | 1.5058 |
| 10:58 59 s 029 ms | 1.4968 | 1.5112 | 1.5040 |
| 10:59 00 s 119 ms | 1.4963 | 1.5152 | 1.5058 |
| $^{IL}$10:59 07 s 009 ms | 1.4939 | 1.5132 | 1.5036 |
| 10:59 10 s 519 ms | 1.4978 | 1.5022 | 1.5000 |
| 10:59 19 s 259 ms | 1.4824 | 1.5153 | 1.4989 |
| 10:59 21 s 619 ms | 1.4799 | 1.5068 | 1.4934 |
| 10:59 26 s 259 ms | 1.4879 | 1.5001 | 1.4940 |
| 10:59 32 s 951 ms | 1.4895 | 1.5078 | 1.4987 |
| 10:59 35 s 324 ms | 1.4965 | 1.5039 | 1.5002 |
| 10:59 42 s 756 ms | 1.4922 | 1.5075 | 1.4999 |
| 10:59 49 s 999 ms | 1.4995 | 1.5065 | 1.5030 |
| 10:59 53 s 267 ms | 1.4968 | 1.5036 | 1.5002 |
| 10:59 59 s 324 ms | 1.4958 | 1.5046 | 1.5002 |

At step 422, liquidity check module 314 may identify any illiquid snapshots among the N volume weighted snapshots (determined in step 420). If liquidity check module 314 identifies any illiquid snapshots, liquidity check module 314 may discard the identified illiquid snapshots. Illiquid snapshots may occur, for example, because there is not enough volume tradeable at that snapshot time. Because there is not enough tradable volume, it may not be possible to fill the SMS. To prevent this situation, illiquid snapshots may be discarded.

For the example above it may be assumed that the snapshots at 10:58 31 s 005 ms and 10:59 07 s 009 ms (designated as $^{IL}$ in Table 7) do not have enough volume to fill the SMS and therefore could not have a VWAMP calculated from these data values. These two illiquid snapshots may be discarded, leaving 22 remaining volume weighted snapshots.

At step 424, benchmark calculator 312 may determine whether there are any snapshots left after the liquidity check (step 422). If all of the snapshots fail the liquidity check, this may indicate that there was not sufficient volume to fill the SMS during the entire predefined data collection time period. This condition may also occur if liquidity was somehow pulled across the entire market just before each snapshot time. This condition, however, should not occur, because the randomised snapshot times are not generated until after the data collection time period window closes.

When benchmark calculator 312 determines, at step 424, that there are no liquid snapshots left (i.e., all snapshots fail the liquidity check), benchmark calculator 312 may cause secure data system 112 or 200 to publish a "No Publication" indication for the particular instrument and/or tenor (step 426).

When benchmark calculator 312 determines, at step 424, that there are liquid snapshots left (i.e., at least one snapshot passes the liquidity check), step 424 proceeds to step 428.

At step 428, crossed/zero spread order book identifier 316 may identify any crossed order books and/or any zero spread synthetic order books. When identifier 316 identifies, at step 428, at least one crossed or zero spread synthetic order book, identifier 316 may exclude the identified synthetic order book (step 430) from the benchmark data value(s) calculation. The process may then continue to step 432 (i.e., for any remaining currencies and/or tenors).

When identifier 316, at step 428, does not identify any crossed or zero spread synthetic order books, step 428 proceeds to step 432.

Because each synthetic order book 310 takes price data from multiple trading venues, it is possible to have a situation where the bid prices in a synthetic order book 310 are higher than the offer prices. This situation is referred to as a crossed order book. An example crossed order book is shown in Table 8.

TABLE 8

Example Crossed Order Book
Synthetic Order Book

| Bid Volume (m) | Price | Offer Volume (m) |
| --- | --- | --- |
|  | 1.5660 | 19 |
|  | 1.5630 | 49 |
|  | 1.5480 | 17 |
| $20^{CO}$ | 1.5400 | 30 |
|  | 1.5260 | $23^{CO}$ |
| ... |  |  |
| 32 | 1.4590 |  |
| 16 | 1.4530 |  |
| 19 | 1.4500 |  |
| 35 | 1.4490 |  |
| 32 | 1.4360 |  | where $^{CO}$ represents a crossed order.

In this situation, a trading counterparty could perform risk-free arbitrage by simultaneously buying twenty million at 1.5260 and selling at 1.5400. Executing this trade would remove the crossed book and leave the 'normal' prices remaining.

However, a crossed order book scenario is unlikely to occur. Even if this scenario did occur, the market would quickly correct itself. Accordingly, the crossed synthetic order book should only exist momentarily, and would not be truly representative of the market during the data collection window. Therefore, identifier 316 identifies and excludes any crossed order books (steps 428 and 430) after discarding any illiquid snapshots (step 422), and before discarding any outlier snapshots (step 434). Step 430 may remove the particular crossed synthetic order book and the process may continue to step 432.

It may also be theoretically possible that all of the N snapshots (e.g., 24 snapshots) contain crossed order books. For example, price data on one data entity may have ceased to be equivalent to price data on the other data entities, because of a change in the rule books of one or more of the data entities. This scenario is unlikely to occur in practice, because a data entity would have to change its rule book without prior notification. However, data entities 104 may have regulatory obligations to publicize changes to their rule books. Accordingly, DTPS 106 may be notified in advance of the intended change, and may determine whether to exclude or adjust for the particular data entity. However, if this scenario did occur, identifier 316 may exclude all of the snapshots and publish a 'No Publication' indication for the particular instrument and/or tenor, on the basis that the data is no longer representative.

Similar to the crossed order book case, it is possible to have a situation where a synthetic order book 310 has a VWB equal to a VWO. This situation is referred to as a zero spread order book. There are at least two situations that may generate this case. In a first situation, the synthetic order book is actually crossed and the VWB and VWO just happen to give the same value. In a second situation, there is bid volume and offer volume larger than the SMS at the same price. Table 9 illustrates an example zero spread order book.

TABLE 9

Zero Spread Order Book
Synthetic Order Book (Situation 2)

| Bid Volume (m) | Price | Offer Volume (m) |
| --- | --- | --- |
|  | 1.5660 | 19 |
|  | 1.5630 | 49 |
|  | 1.5480 | 17 |
|  | 1.5400 | 30 |
| $65^{SP}$ | 1.5260 | $70^{SP}$ |
| ... |  |  |
| 32 | 1.4590 |  |
| 16 | 1.4530 |  |
| 19 | 1.4500 |  |
| 35 | 1.4490 |  |
| 32 | 1.4360 |  | where $^{SP}$ represents a same price.

The first situation represents a crossed order book and would be excluded, as described above. The second situation may also be excluded for similar reasons to the crossed order book. It is expected that buyers and sellers would trade with each other at this price and that this situation would only exist momentarily. Identifier 316 may exclude any identified zero spread synthetic order books similarly to excluding a crossed order book.

At step 432, benchmark calculator 312 may determine whether there are two or fewer snapshots remaining after the liquidity check (step 422) and crossed/zero spread order book check (step 428). If there are two or fewer snapshots remaining, benchmark calculator 312 may cause the process to proceed to step 436, thereby bypassing (or suspending) the outlier check (step 434).

When benchmark calculator 312 determines, at step 432, that there are greater than 2 snapshots remaining, step 432 may proceed to the outlier check (step 434).

A percentile function used by outlier check module 318 (in step 434) may over exclude snapshots if there are only two snapshots with different VWAMPs, remaining. This situation may occur if the other 22 snapshots (among the 24 example snapshots) have been excluded because they are illiquid, are identified as being crossed order books or identified as being zero spread order books.

For example, the percentile function may calculate the $25^{th}$ and $75^{th}$ percentiles (or any other desired percentiles) as in-between the two VWAMPs. Thus the remaining two snapshots would both be excluded, resulting in a 'No Publication' indication even though there are two snapshots with valid prices. Table 10 illustrates an example where two remaining snapshots fall outside of the percentile function.

TABLE 10

Snapshots Outside Percentile Function

| Snapshot Time | VWAMP | Percentile | Value |
|---|---|---|---|
| 10:59 32 s 951 ms | 1.4987 | 25th | 1.499075 |
| 10:59 53 s 267 ms | 1.5002 | 75th | 1.499825 |

To prevent this unintended consequence of the percentile function (step 434), if there are two or fewer snapshots remaining, benchmark calculator 312 may suspend the outlier check (step 434) and include both snapshots (or the one snapshot) in benchmark calculation (step 436).

At step 434, outlier check module 318 may identify any outlier snapshots among the remaining volume weighted snapshots (after steps 422-432). If outlier check module 318 identifies any outlier snapshots, outlier check module 318 may discard the identified outlier snapshots. Outlier check (step 434) may be used to protect the benchmark data value(s) determination against any momentary and unrepresentative spikes in the price data.

Outlier check module 318 may rank the remaining snapshots (i.e., that passed the liquidity and order book checks) according to their VWAMPs. Any snapshots with a VWAMP greater than the 75th percentile or less than the 25th percentile (or any other desired or appropriate percentiles) may be discarded from the snapshots. Thus, the outlier snapshots are not used in the benchmark data value(s) determination (step 436). In this example, for the snapshots shown in Table 7, the 25th percentile is 1.498575 and the 75th is 1.501025.

At step 436, benchmark calculator 312 may determine the benchmark data value(s) based on the remaining snapshots. The benchmark data value (for an or tenor) is the quality-weighted average of the remaining VWAMPs (for the respective asset or tenor). The remaining snapshots are those that have passed the liquidity check (step 422), the order book check (step 428) and that also have a VWAMP that is between 1.498575 and 1.501025 (i.e., the outlier check of step 434). For the example, from the 24 original snapshots (shown in Table 7), 2 failed the liquidity check, and 10 were excluded by the outlier check, leaving 12 remaining for the final calculation. Table 11 shows each snapshot and snapshots remaining after the liquidity and outlier checks.

TABLE 11

Snapshots Remaining After Liquidity and Outlier Checks

| Snapshot Time | VWB | VWO | VWAMP | Liquidity Check | Outlier Check |
|---|---|---|---|---|---|
| 10:58 02 s 125 ms | 1.4567 | 1.5336 | 1.4952 | Pass | Fail |
| **10:58 07 s 145 ms | 1.4935 | 1.5062 | 1.4999 | Pass | Pass |
| 10:58 12 s 568 ms | 1.4859 | 1.5092 | 1.4976 | Pass | Fail |
| **10:58 19 s 821 ms | 1.4962 | 1.5051 | 1.5007 | Pass | Pass |
| **10:58 20 s 125 ms | 1.4967 | 1.5034 | 1.5001 | Pass | Pass |
| 10:58 28 s 855 ms | 1.4812 | 1.5151 | 1.4982 | Pass | Fail |
| 10:58 31 s 005 ms | 1.4967 | 1.5028 | 1.4998 | Fail | N/A |
| **10:59 38 s 599 ms | 1.4989 | 1.5005 | 1.4997 | Pass | Pass |
| **10:58 44 s 525 ms | 1.4922 | 1.5092 | 1.5007 | Pass | Pass |
| 10:58 47 s 519 ms | 1.4965 | 1.5074 | 1.5020 | Pass | Fail |
| 10:58 52 s 325 ms | 1.4981 | 1.5134 | 1.5058 | Pass | Fail |
| 10:58 59 s 029 ms | 1.4968 | 1.5112 | 1.5040 | Pass | Fail |
| 10:59 00 s 119 ms | 1.4963 | 1.5152 | 1.5058 | Pass | Fail |
| 10:59 07 s 009 ms | 1.4939 | 1.5132 | 1.5036 | Fail | N/A |
| **10:59 10 s 519 ms | 1.4978 | 1.5022 | 1.5000 | Pass | Pass |
| **10:59 19 s 259 ms | 1.4824 | 1.5153 | 1.4989 | Pass | Pass |
| 10:59 21 s 619 ms | 1.4799 | 1.5068 | 1.4934 | Pass | Fail |
| 10:59 26 s 259 ms | 1.4879 | 1.5001 | 1.4940 | Pass | Fail |
| **10:59 32 s 951 ms | 1.4895 | 1.5078 | 1.4987 | Pass | Pass |
| **10:59 35 s 324 ms | 1.4965 | 1.5039 | 1.5002 | Pass | Pass |
| **10:59 42 s 756 ms | 1.4922 | 1.5075 | 1.4999 | Pass | Pass |
| 10:59 49 s 999 ms | 1.4995 | 1.5065 | 1.5030 | Pass | Fail |
| **10:59 53 s 267 ms | 1.4968 | 1.5036 | 1.5002 | Pass | Pass |
| **10:59 59 s 324 ms | 1.4958 | 1.5046 | 1.5002 | Pass | Pass | where **represents data snapshots that pass.

At step 436, benchmark calculator 312 activates weighting module 320, to determine a quality weighting of the remaining snapshots. Weighting module 320 may measure a quality for each remaining snapshot according to a tightness of the spread between the VWB and the VWO. A tighter spread means that the VWAMP for that snapshot is a more reliable indication of being able to fill standard market size at a price close to that VWAMP.

Benchmark calculator 312 may combine the remaining VWAMPs using a weighted average with the inverse of the spreads as the weighting factor.

The quality weighting for the remaining snapshots (Table 11) is shown in Table 12.

TABLE 12

Quality Weighted Snapshots

| Snapshot Time | VWB | VWO | VWAMP | Spread | Weighting |
|---|---|---|---|---|---|
| 10:58 07 s 145 ms | 1.4935 | 1.5062 | 1.4999 | 0.0183 | 4% |
| 10:58 19 s 821 ms | 1.4962 | 1.5051 | 1.5007 | 0.0127 | 6% |
| 10:58 20 s 125 ms | 1.4967 | 1.5034 | 1.5001 | 0.0089 | 8% |
| 10:59 38 s 599 ms | 1.4989 | 1.5005 | 1.4997 | 0.0067 | 11% |
| 10:58 44 s 525 ms | 1.4922 | 1.5092 | 1.5007 | 0.0080 | 9% |
| 10:59 10 s 519 ms | 1.4978 | 1.5022 | 1.5000 | 0.0170 | 4% |
| 10:59 19 s 259 ms | 1.4824 | 1.5153 | 1.4989 | 0.0044 | 17% |
| 10:59 32 s 951 ms | 1.4895 | 1.5078 | 1.4987 | 0.0140 | 5% |
| 10:59 35 s 324 ms | 1.4965 | 1.5039 | 1.5002 | 0.0074 | 10% |
| 10:59 42 s 756 ms | 1.4922 | 1.5075 | 1.4999 | 0.0153 | 5% |
| 10:59 53 s 267 ms | 1.4968 | 1.5036 | 1.5002 | 0.0068 | 11% |
| 10:59 59 s 324 ms | 1.4958 | 1.5046 | 1.5002 | 0.0088 | 8% |

Benchmark calculator 312 may sum the weighted VWAMPs to determine the benchmark data value. For the example shown in Table 12, the benchmark data value is 1.499876 (with full granularity) and is 1.500 (with 3 decimal points for publication).

The above example describes a single benchmark data value for a particular asset and one tenor. In general, data generator system 114 or 300 may determine one or more benchmark data values depending upon the number of assets and/or tenors being tracked.

At step 438, data generator system 114 or 300 may transfer the benchmark data value(s) (determined in step 436) to secure data system 112 or 200, such that secure data system 112 or 200 stores the benchmark data value(s) in benchmark storage 218.

At step 440, secure data system 112 or 200 may permit authorized benchmark receivers 108 to access the benchmark data value(s) stored in storage 218 (e.g., via secure file transfer). Receivers 108 may then permit authorized end users (not shown) to view the benchmark data value(s) in real time and/or receive information from end users for pricing trades and/or cash flows. Receivers 108 may also display or generally indicate a "No Publication" indication for a time period where a benchmark data value may not be determined (such as based on step 426).

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

In some non-limiting implementations, a data exchange system may refer to an electronic exchange system. In such implementations, a synthesized order book (e.g., a second storage) may store tradeable quote data, including bid and offer data associated with an asset for a particular snapshot time. The benchmark data generator system may include a benchmark calculator configured to determine a volume weighted average mid-price value using the synthesized order books. The benchmark calculator may determine the mid-price value by simulated filling of a trade order of standard market size (SMS) using prices available on all of the data entities at the snapshot times, in the relevant currency and/or tenor. The mid-price value may represent the benchmark data value. In some examples, the benchmark calculator may also remove outlier and/or illiquid snapshots before determining the benchmark value. In some example, the benchmark calculator may also remove any crossed and/or zero spread synthetic order books. In some examples, the benchmark calculator may use a quality weighting based on bid and order spreads to determine the benchmark data value.

In some examples, the benchmark data value may include one or more values for various currencies and/or tenors at one or more predefined time periods. In some examples, the benchmark data value(s) may represent a mid-price value for interest rate swaps (i.e., for the fixed leg), in various currencies and/or tenors at one or more particular time period throughout a day. The systems and methods described herein are effective for use in connection with all types of benchmark values, including with various swaps for various products (e.g., interest rate swaps, currency swaps, commodity swaps, debt swaps, total return swaps). However, and solely for exemplary and illustrative purposes, aspects of the present disclosure shall be described in the context of interest swap rates.

Existing benchmark swap rate systems typically receive swap rate estimates determined from plural submitting banks (e.g., 12 banks) at particular times of the day. The systems then determine a benchmark rate based on an average of the received swap rate estimates. A swap rate estimate, however, may not represent an accurate price. For example, if a submitting bank has any knowledge of the estimates being submitted by other banks at a particular time, the bank may manipulate its estimate, in an attempt to shift the average swap rate.

Existing benchmark swap rate systems also suffer from a submission window-time synchronization problem. In existing systems, the swap rate estimates are based on transactions. A transaction may represent a firm price for an actual trade. A trade occurs at a fixed point in time when a buyer actually purchases a given amount of a certain currency. A transaction generally represents a trustworthy value of an asset. However, because there is typically a delay between a time a commitment is made for the transaction and a time to clear the transaction, the transaction may be provide a delayed representation of the market. Accordingly, a swap rate estimate at 11 am based on transactions may actually represent the market at 10:30 am. Thus, estimates based on transactions (trade data) may not provide a current depiction of the market.

Example systems and methods of the present disclosure may determine a benchmark swap rate based on up-to-date tradeable quote data (not transactions) and associated volume data received from electronic multilateral trading venues (i.e., data entities). In some examples, the electronic trading venues may include regulated trading venues. A benchmark data generator system (not submitting banks or data entities) may determine a representative benchmark swap rate at a particular time. A data tampering prevention system may receive every tradeable quote update collected by a data entity over a predefined time period. Thus, a system according to this disclosure may receive representative price data (not swap rate estimates) from all data entities across the entire market. Accordingly, the exemplary system can reconstruct, at particular moments, what was available across the entire data exchange market. Because the data tampering prevention system receives tradeable quote data and associated volume data (i.e., raw data), it may prevent a data entity from manipulating the data, thereby leading to a more accurate benchmark value.

Example systems and methods of the present disclosure may use tradeable quote data to determine the benchmark value. The tradeable quote data may represent tradable quote prices and volume of both bid and offers for an asset. Tradeable quote data may be described as firm (i.e., a data entity may be legally required to trade based on the quote data). Quote data may be replaced with new quote data (i.e., updated) at different times as bid and offer data changes. Thus, the quote data may indicate a current representation of the entire market at that particular point in time. In contrast, transaction data may be too far behind the quote data to accurately depict the current market.

According to aspects of the present disclosure, benchmark data users may be different from trading parties that enter quotes on the trading venues. Thus, the quote data (used to determine the benchmark value) is separate from benchmark user activity. By using quote data (as opposed to swap rate estimates) to determine the benchmark value, benchmark users may not influence the benchmark determination. In some examples, different institutions (e.g., banks, hedge funds, other institutions, etc.) can perform hedging activity against the same quotes used to benchmark (i.e., the true market value).

The data tampering prevention system of the present disclosure offers new benchmark swap rate opportunities based on tradeable quote data collected by data entities across the market, while preventing data tampering by data entities, so as to effectively provide an accurate benchmark price representative of the entire market at a point in time. Previous solutions were limited to swap rate estimates based on transactions, that were subject to data tampering. The data tampering prevention system of this disclosure is able to determine benchmark value(s) without any human judgement, thereby preventing data tampering. The solutions described herein utilize the power, speed and precision of a special purpose computer programmed to execute the algorithms described herein that is not a mere method of organization or which may be executed by a human in a plausible manner. Instead, the systems and methods described herein are necessarily rooted in computer technology in order to overcome a problem specifically arising in the realm of computer networks so as to provide an improvement in the functioning of a computer, computer system and/or computer network. For example, the large volume of quote data (e.g., 45 million data points) that may be timestamped in milliseconds or nanoseconds cannot be processed by a human and reported to benchmark receivers in a practical time period without rendering the published results stale and unusable. Furthermore, processing the data by a human would defeat the purpose of the system to prevent data tampering.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with an electronic data exchange system and the data tampering prevention system described herein, such as, for example, any public and/or private networks, including, for instance, the Internet, an intranet, or an extranet, any wired or wireless networks or combinations thereof.

Figure 6:
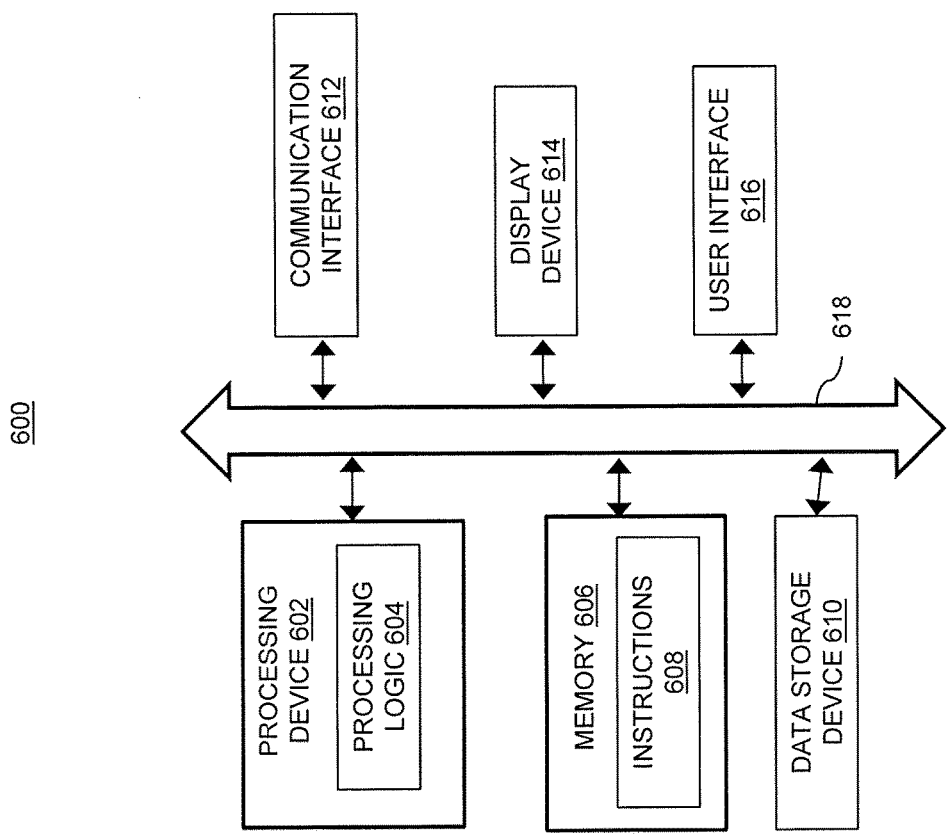
FIG. 6 is a functional block diagram of an example computer system, according to an aspect of the present disclosure.

The terms "data entity," "electronic exchange server", "electronic data exchange" and "electronic exchange system" may be used interchangeably and shall refer to any type of a computing device, system or venue that is capable of carrying out electronic data exchanges. For example, an electronic exchange system may refer to a simple data transfer/exchange system or, in one particular non-limiting implementation, to an electronic asset exchange system or device such as a commodities exchange, a futures execution facility, an options exchange, a cash equities exchange, a swap execution facility, an unregulated electronic transaction execution venue or any other type of an exchange venue known in the art. The term "regulated data entity," "regulated electronic exchange server" and "regulated electronic exchange system" may be used interchangeably and shall refer to an electronic exchange system subject to regulatory and/or legal requirements, such as prohibiting misrepresentation of market data. The electronic exchange server may comprise one or more processors configured to execute instructions stored in a non-transitory memory (such as shown in FIG. 6). The electronic exchange server may be configured to place orders in connection with assets over a network when the instructions are executed. An electronic exchange server may be embodied on a single computing device, while in other embodiments, an electronic exchange server may refer to a plurality of computing devices housed in one or more facilities that are configured to jointly provide local or remote computing services to one or more users or user devices. The electronic exchange server may send and receive data from user devices, data servers, or any other type of computing devices or entities over the Internet, over a Wi-Fi connection, over a cellular network or via any other wired or wireless connection or network known in the art.

The term "asset" shall include any type of asset or instrument, including financial instruments of any class, such as, without limitation, outright options, spread options, option combinations, commodities, derivatives, shares, bonds and currencies. The term "derivatives" shall further refer to any type of options, caps, floors, collars, structured debt obligations and deposits, swaps, futures, forwards and various combinations thereof or any other type of instruments that derive from another underlying instrument.

The term "trade" shall refer to any type or part of a transaction or exchange that may occur in connection with one or more assets.

The term "swap" shall refer to any type of contract through which two parties exchange assets (e.g., instruments). The term "swap rate" shall refer to a rate of a fixed portion of a swap as determined by a particular market.

FIG. 6 illustrates a functional block diagram of a machine in the example form of computer system 600 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, DTPS 106 (FIG. 1) may be implemented by the example machine shown in FIG. 6 (or a combination of two or more of such machines).

Example computer system 600 may include processing device 602, memory 606, data storage device 610 and communication interface 612, which may communicate with each other via data and control bus 618. In some examples, computer system 600 may also include display device 614 and/or user interface 616.

Processing device 602 may include, without being limited to, a microprocessor, a central processing unit, an application specific integrated circuit (ASIC), a field programmable gate array (FPGA), a digital signal processor (DSP) and/or a network processor. Processing device 602 may be configured to execute processing logic 604 for performing the operations described herein. In general, processing device 602 may include any suitable special-purpose processing device specially programmed with processing logic 604 to perform the operations described herein.

Memory 606 may include, for example, without being limited to, at least one of a read-only memory (ROM), a random access memory (RAM), a flash memory, a dynamic RAM (DRAM) and a static RAM (SRAM), storing computer-readable instructions 608 executable by processing device 602. In general, memory 606 may include any suitable non-transitory computer readable storage medium storing computer-readable instructions 608 executable by processing device 602 for performing the operations described herein. Although one memory device 608 is illustrated in FIG. 6, in some examples, computer system 600 may include two or more memory devices (e.g., dynamic memory and static memory).

Computer system 600 may include communication interface device 612, for direct communication with other computers (including wired and/or wireless communication) and/or for communication with network 110 (FIG. 1). In some examples, computer system 600 may include display device 614 (e.g., a liquid crystal display (LCD), a touch sensitive display, etc.). In some examples, computer system 600 may include user interface 616 (e.g., an alphanumeric input device, a cursor control device, etc.).

In some examples, computer system 600 may include data storage device 610 storing instructions (e.g., software) for performing any one or more of the functions described herein. Data storage device 610 may include any suitable non-transitory computer-readable storage medium, including, without being limited to, solid-state memories, optical media and magnetic media.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

For purposes of this disclosure the term "product" or "financial product" or "financial asset" should be broadly construed to comprise any type of asset including, without limitation, commodities, derivatives, shares, bonds, and currencies. Derivatives, for example, should also be broadly construed to comprise (without limitation) any type of options, caps, floors, collars, structured debt obligations and deposits, swaps, futures, forwards, and various combinations thereof.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for secure data exchange and data tampering prevention, the system comprising:
a secure data system configured to receive a plural number of electronic data files from a respective plurality of data entities via secure communication over a network, and store the received electronic data files in a first storage of the secure data system, each electronic data file comprising data values comprising tradable quote data, each data value of the data values associated with a timestamp and collected by the respective plurality of data entities during a first time period, wherein at least one of the data values violate a predetermined threshold, wherein at least a second of the data values is manipulated during the first time period by the respective data entity to artificially influence a benchmark data value; and
a benchmark data generator system communicatively coupled to the secure data system, the benchmark data generator system comprising:
a randomized snapshot generator that
determines, after the first time period, a plural number of randomized snapshot times,
evaluates the determined snapshot times and timestamps of the each data value to identify a portion of the data values that correspond to the determined plural number of randomized snapshot times,
wherein the respective plurality of data entities are hindered from predicting the determined plural number of randomized snapshot times during the first time period,
whereby the artificial influence is thwarted when the at least second of the data values that is manipulated are excluded from the portion in response to the evaluation;
plural second storage corresponding to the plural number of randomized snapshot times;
a synthetic data generator configured to: a) create a data mapping between the first storage and the plural second storage, based on the randomized snapshot times and the timestamps and b) selectively transfer the portion of the data values in each electronic data file from the first storage to the plural second storage according to the data mapping, such that each second storage stores corresponding samples synthesized from the respective plurality of data entities associated with a single respective randomized snapshot time, the selectively transferred samples including the at least one of the data values that violate the predetermined threshold;
a check module configured to identify one or more of the selectively transferred samples that includes the at least one of the data values that violate the predetermined threshold,
the check module discarding said identified samples;
and a benchmark calculator configured to determine the benchmark data value for a data environment comprising the plurality of data entities, based on the synthetized samples stored in the plural second storage.

2. The system of claim 1, wherein the benchmark data generator system is configured to transmit the benchmark data value to the secure data system for storage in a third storage of the secure data system.

3. The system of claim 2, wherein the secure data system is further configured to permit one or more authorized benchmark data receivers access to the benchmark data value stored in the third storage.

4. The system of claim 3, wherein the secure data system includes a secure file transfer module configured to perform a secure file transfer process between a) the plurality of data entities and the secure data system and b) the one or more authorized benchmark data receivers and the secure data system.

5. The system of claim 1, wherein the secure data system is configured to at least one of authenticate each data entity and validate each received electronic data file.

6. The system of claim 1, wherein the benchmark data generator system is configured to determine the benchmark data value based on the synthetized samples stored among the plural second storage associated with the respective randomized snapshot times.

7. The system of claim 6, wherein each data value includes quote data and associated volume data corresponding to an asset, and the benchmark calculator is configured to determine, for each randomized snapshot time, a volume weighted average data value based on the synthetized samples in the corresponding second storage, the benchmark data value determined based on a plurality of volume weighted average data values corresponding to a respective remaining number of the randomized snapshot times.

8. The system of claim 7, wherein the benchmark data generator system is configured to identify illiquid data among the plurality of volume weighted average data values having less than a predetermined volume and discard the identified illiquid data prior to determining the benchmark data value.

9. The system of claim 7, wherein the benchmark data generator system is configured to identify a storage among the plural second storage having crossed order data and discard the identified storage prior to determining the benchmark data value.

10. The system of claim 7, wherein the benchmark data generator system is configured to identify a storage among the plural second storage having zero spread order data and discard the identified storage prior to determining the benchmark data value.

11. The system of claim 7, wherein the benchmark data generator system is configured to identify outlier data among the plurality of volume weighted average data values outside of a predetermined tolerance range and discard the identified outlier data prior to determining the benchmark data value.

12. The system of claim 7, wherein the synthesized samples in each second storage includes bid and offer data associated with respective quote data, the benchmark calculator configured to determine the benchmark data value based on an average of the plurality of volume weighted average weighted according to a spread between the respective bid and offer data.

13. They system of claim 7, wherein each volume weighted average value includes a volume weighted average mid-price (VWAMP) value, the benchmark calculator configured to determine the VWAMP based on simulated filling of a trade in a standard market size volume using volume weighted bid and offer data in the corresponding second storage.

14. A method for secure data exchange and data tampering prevention, the method comprising:
receiving, by a secure data system, a plural number of electronic data files from a respective plurality of data entities via secure communication over a network, each electronic data file comprising tradable quote data, each data value associated with a timestamp and collected by the respective plurality of data entities during a first time period, wherein at least one of the data values violate a predetermined threshold, wherein at least a second of the data values is manipulated during the first time period by the respective data entity to artificially influence a benchmark data value;
storing, by the secure data system, the received electronic data files in a first storage of the secure data system;
detecting, by a benchmark data generator system communicatively coupled to the secure data system, the received electronic data files;
determining, after the first time period and by a randomized snapshot generator of the benchmark data generator system, a plural number of randomized snapshot times, responsive to the detection;
evaluating, by the randomized snapshot generator, the determined snapshot times and timestamps of the each data value,
identifying, by the randomized snapshot generator, a portion of the data values that correspond to the determined plural number of randomized snapshot times in response to the evaluation,
wherein the respective plurality of data entities are hindered from predicting the determined plural number of randomized snapshot times during the first time period,
whereby the artificial influence is thwarted when the at least second of the data values that is manipulated are excluded from the portion in response to the evaluation;
creating plural second storage of the benchmark data generator system corresponding to the plural number of randomized snapshot times;
creating, by a synthetic data generator of the benchmark data generator system, a data mapping between the first storage and the plural second storage, based on the randomized snapshot times and the timestamps;
selectively transferring, by the synthetic generator, the portion of the data values in each electronic data file from the first storage to the plural second storage according to the data mapping, such that each second storage stores corresponding samples synthesized from the respective plurality of data entities associated with a single respective randomized snapshot time, the selectively transferred samples including the at least one of the data values that violate the predetermined threshold;
identifying, by a check module of the benchmark data generator system, one or more of the selectively transferred samples that includes the at least one of the data values that violate the predetermined threshold;
discarding, by the check module, said identified samples; and
determining, by a benchmark calculator of the benchmark data generator system, the benchmark data value for a data environment comprising the plurality of data entities, based on the synthetized samples stored in the plural second storage.

15. The method of claim 14, wherein the determining, by the benchmark data generator system, of the benchmark data value is based on the synthetized samples stored among the plural second storage associated with the respective randomized snapshot times.

16. The method of claim 15, wherein each data value includes quote data and associated volume data corresponding to an asset and the method further comprises determining, by the benchmark data generator system, for each randomized snapshot time, a volume weighted average data value based on the synthetized samples in the corresponding second storage, wherein the benchmark data value is determined based on a plurality of volume weighted average data values corresponding to a respective remaining number of the randomized snapshot times.

17. The method of claim 16, the method further comprising identifying, by the benchmark data generator system, illiquid data among the plurality of volume weighted average data values having less than a predetermined volume and discarding the identified illiquid data prior to determining the benchmark data value.

18. The method of claim 16, the method further comprising identifying, by the benchmark data generator system, a storage among the plural second storage having at least one of crossed order data and zero spread order data and discarding the identified storage prior to determining the benchmark data value.

19. The method of claim 16, the method further comprising identifying, by the benchmark data generator system, outlier data among the plurality of volume weighted average data values outside of a predetermined tolerance range and discarding the identified outlier data prior to determining the benchmark data value.

20. The method of claim 16, wherein the synthesized samples in each second storage includes bid and offer data associated with the respective quote data, the method further comprising determining, by the benchmark data generator system, the benchmark data value based on an average of the plurality of volume weighted average weighted according to a spread between the respective bid and offer data.

21. The method of claim 14, the method further comprising:
transmitting the benchmark data value to the secure data system for storage in a third storage of the secure data system; and
permitting one or more authorized benchmark data receivers access to the benchmark data value stored in the third storage.

22. A non-transitory computer-readable storage medium programmed to include instructions that, when executed by one or more processing devices, cause the one or more processing devices to perform functions including:
causing a secure data system to receive a plural number of electronic data files from a respective plurality of data entities via secure communication over a network, and store the received electronic data files in a first storage of the secure data system, each electronic data file comprising data values comprising tradable quote data, each data value of the data values associated with a timestamp and collected by the respective plurality of data entities during a first time period, wherein at least one of the data values violate a predetermined threshold, wherein at least a second of the data values is manipulated during the first time period by the respective data entity to artificially influence a benchmark data value;
causing a benchmark data generator system communicatively coupled to the secure data system to detect the received electronic data files; and
causing, responsive to the detection, the benchmark data generator system to:
determine, by a randomized snapshot generator, after the first time period, a plural number of randomized snapshot times,
evaluate the determined snapshot times and timestamps of the each data value to identify a portion of the data values that correspond to the determined plural number of randomized snapshot times,
wherein the respective plurality of data entities are hindered from predicting the determined plural number of randomized snapshot times during the first time period,
whereby the artificial influence is thwarted when the at least second of thedata values that is manipulated are excluded from the portion in response to the evaluation;
create plural second storage corresponding to the plural number of randomized snapshot times;
create, by a synthetic data generator, a data mapping between the first storage and the plural second storage, based on the randomized snapshot times and the timestamps;
selectively transfer, by the synthetic data generator, the portion of the data values in each electronic data file from the first storage to the plural second storage according to the data mapping, such that each second storage stores corresponding samples synthesized from the respective plurality of data entities associated with a single respective randomized snapshot time, the selectively transferred samples including the at least one of the data values that violate the predetermined threshold;
identify, by a check module, one or more of the selectively transferred samples that includes the at least one of the data values that violate the predetermined threshold;
discard, by the check module, said identified samples; and
determine, by a benchmark calculator, the benchmark data value for a data environment comprising the plurality of data entities, based on the synthetized samples stored in the plural second storage.

23. The non-transitory computer-readable storage medium of claim 22, wherein the instructions include further instructions that cause the benchmark data generator system to determine the benchmark data value based on the synthetized samples stored among the plural second storage associated with the respective randomized snapshot times.

* * * * *

UNITED STATES PATENT AND TRADEMARK OFFICE
CERTIFICATE OF CORRECTION

PATENT NO. : 9,767,310 B2  
APPLICATION NO. : 15/287137  
DATED : September 19, 2017  
INVENTOR(S) : Glenville et al.

Page 1 of 1

It is certified that error appears in the above-identified patent and that said Letters Patent is hereby corrected as shown below:

On the Title Page

In the Abstract (57), at Line 15, please change "synthetized" to --synthesized--.

In the Specification

At Column 3, Line 2, please change "synthetized" to --synthesized--.

In the Claims

At Column 26, Lines 53 and 57, please change "synthetized" to --synthesized--.

At Column 30, Line 45, please change "synthetized" to --synthesized--, and at Lines 50 and 51, please change "synthetized" to --synthesized--.

Signed and Sealed this  
Third Day of April, 2018

Andrei Iancu  
*Director of the United States Patent and Trademark Office*